United States Patent [19]

Bahl et al.

[11] Patent Number: 4,929,681

[45] Date of Patent: May 29, 1990

[54] BLENDS OF LLDPE, POLYPROPYLENE AND AROMATIC POLYMERS AND HIGH MODULUS FILMS THEREOF

[75] Inventors: Surinder K. Bahl, Chandigarh, India; Peter J. Canterino, Towaco; Theresa L. Cunningham, Manalapan, both of N.J.; Susan P. Evans, Canandaigua; Richard G. Shaw, Remsen, both of N.Y.

[73] Assignee: Mobil Oil Corporation, New York, N.Y.

[21] Appl. No.: 267,471

[22] Filed: Nov. 4, 1988

Related U.S. Application Data

[63] Continuation-in-part of Ser. No. 61,596, Jun. 18, 1987, abandoned, which is a continuation of Ser. No. 814,716, Dec. 30, 1985, abandoned.

[51] Int. Cl.⁵ .................... C08L 23/20; C08L 23/12; C08L 25/06; C08J 5/18
[52] U.S. Cl. .................................... 525/240; 428/220
[58] Field of Search ........................ 525/240

[56] References Cited

U.S. PATENT DOCUMENTS

| | | | |
|---|---|---|---|
| 3,254,139 | 5/1966 | Anderson et al. | 525/240 |
| 3,426,105 | 2/1969 | Christensen et al. | 525/240 |
| 4,076,698 | 2/1978 | Anderson et al. | 526/348.6 |
| 4,565,847 | 1/1986 | Bahl et al. | 525/240 |
| 4,579,912 | 4/1986 | Canterino et al. | 525/240 |

FOREIGN PATENT DOCUMENTS 59-041342  3/1984  Japan .

*Primary Examiner*—Carman J. Seccuro
*Attorney, Agent, or Firm*—Alexander J. McKillop; Charles J. Speciale; James P. O'Sullivan, Sr.

[57] ABSTRACT

Films containing LLDPE having a high modulus and good tear strength for the high modulus and improved processing conditions are obtained by blending minor amounts of polystyrene or other aromatic polymer, and polypropylene with the LLDPE.

9 Claims, No Drawings

BLENDS OF LLDPE, POLYPROPYLENE AND AROMATIC POLYMERS AND HIGH MODULUS FILMS THEREOF

This application is a continuation-in-part of U.S. patent application Ser. No. 061,596 filed June 18, 1987, now abandoned which, in turn, was a continuation application of U.S. patent application Ser. No. 814,716 filed Dec.30, 1985, now abandoned.

BACKGROUND OF THE INVENTION

Linear low and medium density polyethylene copolymers (LLDPE) are widely used commercially in films which are conventionally prepared by blown film extrusion. Such films have generally good properties, but often exhibit undesirably low stiffness for many uses. It is also desirable to obtain blends of these polymers which require less power to extrude and which can be extruded through a narrower die gap.

U.S. Pat. No. 4,565,847 having the same assignee as herein, describes films of LLDPE, polypropylene and ethylene-propylene rubbers having improved stiffness and good tear strength.

Similarly, improvements in MD tear strength and stiffness of films are obtained by blending small amounts of polystyrene (up to about 10 weight percent) with LLDPE as described in U.S. Pat. No. 4,579,912. Higher amounts of polystyrene in excess of about 10 weight percent causes drastic loss of tear strength.

In accordance with this invention both polystyrene (PS), or other aromatic polymer, and polypropylene are blended with LLDPLE to give films with a high modulus and with better tear strength than can be obtained with LLDPE/PP or LLDPE/PS blends. At the same time, better processing characteristics are achieved.

SUMMARY OF THE INVENTION

The polymer blends of this invention comprise a major proportion linear low density polyethylene (LLDPE), and polypropylene (PP) and a polymer of an aromatic hydrocarbon in minor proportions. The proportions are selected to obtain films of high modulus and acceptable tear strength and to improve processing conditions.

DETAILED DESCRIPTION OF THE INVENTION

The blends of this invention generally comprise:
60 to 95 weight percent of a linear low density copolymer of ethylene and an olefin having 4 to 10 carbon atoms (LLDPE);
1 to 20 weight percent of polypropylene (PP) or a high propylene content copolymer; and
1 to 20 weight percent of a polymer of an aromatic monomer.

The amounts of polypropylene and aromatic polymer are selected to achieve the desired stiffness (modulus) and the amounts can vary somewhat depending on the alpha-olefin comonomer used to prepare the LLDPE, the melt index of the LLDPE and other factors. Similarly, the ratio of PP to aromatic polymer is selected to achieve the desired tear strength and modulus can vary depending on the nature of the LLDPE and the amount of PP. Generally, the proportion of PP to aromatic polymer is from 8:1 to 1:8, preferably 5:1 to 1:5 and most preferably 1:3 to 3:1.

Preferred compositions comprise 75 to 90 weight percent of LLDPE; 5 to 15 weight percent PP; and 5 to 15 weight percent of the aromatic polymer, most preferably polystyrene.

The blends of this invention can be physical blends of pellets of the separate ingredient or melt blends. The blends in either case are intended to ultimate formation into articles such as films having a high modulus and good tear strength.

The term linear low density polyethylene (LLDPE) as used herein refers to copolymers of ethylene and an alpha-olefin having 4 to 10 carbon atoms. Representative alpha-olefins include butene, hexene and octene. Generally, the LLDPE contains up to about 10 weight percent of polymerized alphaolefin, has a density of 0.9 to 0.94 with 0.91 to 0.93 preferred and a melt index of 0.2 to 10. The preparation of LLDPE is described in U.S. Pat. No. 4,076,698 which is incorporated herein by reference. LLDPE is also commercially available.

The polypropylene (PP) referred to herein includes any of the known homopolymers polymers of this class, as well as ethylene-propylene copolymers having a high propylene content which is generally about 90 weight percent. Ethylene-propylene copolymers with a propylene content of about 97 weight have been found to be suitable, many of which are commercially available. The polypropylene homopolymer or copolymer is selected for its ability to impart stiffness to the blend as shown by increased secant modulus. Accordingly, ethylene-propylene copolymers having a sufficient propylene content to impart the desired stiffness are useful in this invention.

Polystyrene and poly(para-methylstyrene) resins are particularly suitable as the aromatic polymer which is blended with the ethylene polymer. The aromatic polymer can also contain comonomers providing that the aromatic monomer is the predominant constituent. For instance, high impact polystyrene can be used.

Compatibilizers can be used in small amounts up to about 2 weight percent of the composition. Suitable compatibilizers include block copolymers of styrene-ethylene propylene-styrene (Kraton G), block copolymers of styrene and ethylene (Shelvis) and ethylene propylene copolymers (Vistalon 3707).

The resin blends are formed into films in the conventional manner for example by blown film extrusion process using conventional techniques. Preferably, films are made by tubular blown film extrusion to obtain films which are generally from about 0.5 to 5 mils in thickness. Blown film is relatively thin as compared to film or sheet used in molding operations and is generally used in flexible packaging. In this process a narrow molecular weight distribution polymer is melt extruded through an extruder. Tubular products, for example, bags, can be produced. The tube may also be slit to form flat film. The film may also be oriented.

The invention is illustrated by the following non-limiting examples.

EXAMPLES 1-6

A series of runs using an LLDPE copolymer of ethylene and hexene having a melt index of 0.8 and a 0.920 density, polypropylene (PP) and polystyrene (PS) were made. One mil and 3 mil films were prepared, and tear strength and secant modulus were measured. The results are shown in Table 1.

TABLE 1

| Example | C-1 | C-2 | C-3 | 1 | 2 | 3 | 4 | 5 | 6 |
|---|---|---|---|---|---|---|---|---|---|
| Base Resin: MI.8 | | | | | | | | | |
| LLDPE | 100 | 90 | 90 | 85 | 80 | 75 | 85 | 75 | 83 |
| PS 1240 | — | — | 10 | 5 | 10 | 15 | 10 | 10 | 2 |
| PP 4240 | — | 10 | — | 10 | 10 | 10 | 5 | 15 | 15 |
| Elm. Tear g/mil | | | | | | | | | |
| 1 mil MD | 384 | 321 | 164 | 199 | 120 | 72 | 150 | 71 | 236 |
| TD | 649 | 769 | 592 | 535 | 352 | 156 | 405 | 420 | 469 |
| 3 mil MD | 515 | 524 | 438 | 403 | 352 | 303 | 375 | 272 | 402 |
| TD | 620 | 531 | 677 | 509 | 532 | 396 | 628 | 414 | 482 |
| Secant Modulus ($\times 10^4$ psi) | | | | | | | | | |
| 1 mil MD | 2.70 | 3.56 | 5.60 | 4.94 | 6.35 | 7.52 | 6.01 | 6.34 | 4.10 |
| TD | 2.83 | 2.50 | 4.03 | 3.83 | 4.44 | 4.53 | 4.18 | 4.08 | 4.72 |
| 3 mil MD | 3.04 | 4.14 | 5.63 | 4.92 | 6.15 | 8.55 | 6.40 | 6.96 | 4.96 |
| TD | 3.0 | 3.65 | 3.80 | 4.53 | 5.18 | 5.76 | 4.63 | 5.25 | 4.80 |

EXAMPLES 7–12

In the manner used in Examples 1–6 another series of runs were made in which the LLDPE was a copolymer of the ethylene and hexene having a 0.7 melt index and a density of 0.926. The results are shown in Table 2.

TABLE 2

| Example | C-4 | C-5 | C-6 | 7 | 8 | 9 | 10 | 11 | 12 |
|---|---|---|---|---|---|---|---|---|---|
| Base Resin: MI.7 | | | | | | | | | |
| LLDPE | 100 | 90 | 90 | 85 | 80 | 75 | 85 | 75 | 83 |
| PS | — | — | 10 | 5 | 10 | 15 | 10 | 10 | 2 |
| PP | — | 10 | — | 10 | 10 | 10 | 5 | 15 | 15 |
| Elm. Tear g/mil | | | | | | | | | |
| 1 mil MD | 226 | 215 | 270 | 218 | 121 | 110 | 228 | 78 | 109 |
| TD | 620 | 605 | 453 | 457 | 356 | 269 | 450 | 153 | 186 |
| Secant Modulus ($\times 10^4$ psi) | | | | | | | | | |
| 1 mil MD | 4.00 | — | — | — | 8.15 | 8.22 | — | 9.50 | — |
| TD | 4.80 | — | — | — | 6.15 | 6.00 | — | 6.70 | — |
| Elm. Tear | | | | | | | | | |
| 3 mil MD | 332 | 307 | 357 | 295 | 253 | 223 | 397 | 256 | |
| TD | 497 | 437 | 529 | 510 | 435 | 311 | 315 | 361 | |

EXAMPLES 13–20

The three resins, LLDPE hexene copolymer, polypropylene (PP) and polystyrene (PS) were physically mixed but not melt blended, then fed to a blown film extruder. The LLDPE was a copolymer of ethylene and hexene with a density of about 0.919 and melt indices as indicated in Table 3. One mil films were prepared and film properties and processing characteristics were determined. The results are shown in Table 3.

Melt index (MI) is inversely proportional to molecular weight. A polymer with a relatively high molecular weight and low melt index is very viscous and resistant to flow, it will not pass through a small orifice quickly. Generally a lower melt index resin results in better film properties at the expense of processing characteristics. A desirable film is one which has both good processing characteristics and good film properties.

Examples 13 and 14 were processed with a 0.048" die gap. Examples 15–20 were processed with a 0.100" die gap.

Examples 13 and 15 are standards or controls. Example 14 as compared with Examples 13 and 15 demonstrates a successful blend wherein the film properties are improved yet processing indicated by extruder current

TABLE 3

| Example | 13 | 14 | 15 | 16 | 17* | 18 | 19 | 20 |
|---|---|---|---|---|---|---|---|---|
| Base Resin MI | 1.0 | .25 | 1.0 | .5 | .5 | .5 | .5 | .5 |
| Die Gap | .048" | .048" | .100" | .100" | .100" | .100" | .100" | .100" |
| LLDPE | 100 | 85 | 100 | 90 | 86 | 93 | 95 | 100 |
| PS | — | 6 | — | 10 | — | — | 5 | — |
| PP | — | 9 | — | — | 14 | 7 | — | — |
| Extruder Current Amp. | 58 | 54 | 59 | 50 | 60 | 65 | 64 | 68 |
| Die pressure, psi | 6300 | 6000 | 5500 | 5000 | 4650 | 5850 | 6400 | 6900 |
| Quick Quality Index (QQI) | 147 | 169 | 143 | 135 | 144 | 175 | 183 | 184 |
| MD PPT tear length, cm. | 4.2 | 4.1 | 4.0 | 4.4 | 4.1 | 4.1 | 3.6 | 3.4 |
| Air Impact, psi | 14.2 | 19.6 | 9.2 | 8.3 | 3.7 | 18 | 19 | 17.1 |
| TD Tensile Ultimate, psi | 3300 | 4090 | 3640 | 3750 | 3850 | 4450 | 4270 | 4560 |
| Rupture Cell, area | 20.4 | 24.3 | 22.1 | 21.2 | 28.3 | 29.4 | 29.1 | 30.8 |

*Melt blended prior to extrusion with 1% EPDM (ethylene-propylene-diene monomer copolymer).
QQI is used as a measure of film performance and quality. It is composed of four tests which test the film in different manners, fast and slow, uniaxial and biaxial.

and die pressure, are equivalent to a 1.0 melt index (MI) control.

Examples 16 and 17 exhibit good processing characteristics (low extruder amps and die pressure) but poor film properties. Examples 18 and 19 exhibit good film properties but poor processing characteristics. Example 20 is the base resin for Examples 16–19. This resin has good film properties but is difficult to process.

Thus, Example 14, which is the sample within the present invention, shows both excellent film properties and ideal process characteristics.

Example 14 with a melt index of 0.25 could be expected to have poor processing characteristics. However, because of the unique composition, it demonstrated good processing characteristics along with good film properties.

With blends of LLDPE/PE or LLDPE/PS, high (10–15%) percentages of PP or PS are needed in each of these blends to provide good processing characteristics but these levels reduce the properties of the base LLDPE so greatly that little or no film property advantages are seen. With a three component blend, the total amount of non-LLDPE is 15% but properties are retained. The LLDPE/PS/PP blend resulted in an unexpected improvement in processing conditions along with improved property advantages.

Although the present invention has been described with preferred embodiments, it is to be understood that modifications and variations can be resorted to without departing from the spirit and scope of this invention, as those skilled in the art will readily understand. Such variations and modifications are considered to be within the purview and scope of the appended claims.

What is claimed is:

1. A film comprising a blend of:
   75 to 90 weight percent of a linear low density copolymer of ethylene and an olefin having 4 to 10 carbon atoms (LLDPE) said linear low density copolymer having a density of less than 0.94;
   1 to 20 weight percent of polypropylene (PP) or propylene-ethylene copolymer with a high propylene content; and
   1 to 20 weight percent of a polymer of an aromatic monomer.

2. The film of claim 1 wherein the film is extrusion blown.

3. The film of claim 1 wherein the LLDPE has a density of from about 0.910 to 0.930.

4. The blend of claim 1 in which PP comprises 5 to 15 weight percent and the polymer of an aromatic polymer comprises 5 to 15 weight percent of the total composition.

5. The blend of claim 1 in which the weight percent of PP and polymer of aromatic polymer combined is up to about 15 weight percent of the total composition.

6. The film of claim 1 in which said polymer of an aromatic monomer is polystyrene.

7. The blend of claim 4 in which said polymer of an aromatic monomer is polystyrene.

8. The blend of claim 5 in which said polymer of an aromatic monomer is polystyrene.

9. The film of claim 1 in which said olefin is selected from the group consisting of butene, hexene and octene.

* * * * *